(12) United States Patent
Yeom et al.

(10) Patent No.: US 11,368,531 B2
(45) Date of Patent: Jun. 21, 2022

(54) METHOD AND APPARATUS FOR FILE MANAGEMENT

(71) Applicant: Samsung Electronics Co., Ltd., Gyeonggi-do (KR)

(72) Inventors: Dong-Hyun Yeom, Gyeonggi-do (KR); Geon-Soo Kim, Gyeonggi-do (KR); Sang-Min Huh, Gyeonggi-do (KR); Min-Kyung Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 772 days.

(21) Appl. No.: 14/465,915

(22) Filed: Aug. 22, 2014

(65) Prior Publication Data

US 2015/0106393 A1 Apr. 16, 2015

(30) Foreign Application Priority Data

Oct. 16, 2013 (KR) .......................... 10-2013-0123347

(51) Int. Cl.
*G06F 16/00* (2019.01)
*H04L 67/1097* (2022.01)
(Continued)

(52) U.S. Cl.
CPC ...... *H04L 67/1097* (2013.01); *G06F 11/1458* (2013.01); *G06F 16/178* (2019.01)

(58) Field of Classification Search
CPC ......... G06F 17/30174; G06F 17/30058; G06F 17/30265; G06F 17/30849;
(Continued)

(56) References Cited

U.S. PATENT DOCUMENTS 6,967,675 B1 11/2005 Ito et al.
7,839,420 B2* 11/2010 Ubillos ................. G06F 3/0483
345/619
(Continued)

FOREIGN PATENT DOCUMENTS

JP 3667197 B2 4/2005
JP 4247910 B2 1/2009
(Continued)

OTHER PUBLICATIONS

Lee et al., translated document of Korean Patent Application Publication No. 10-2011-0020147, 32 pages.*
Korean Search Report dated Mar. 21, 2020.

*Primary Examiner* — Monica M Pyo
(74) *Attorney, Agent, or Firm* — Cha & Reiter, LLC

(57) ABSTRACT

The disclosure describes a method in an electronic device. The electronic device comprises a memory, a communication unit, and a processor configured to control the communication unit to establish a network connection with a server after storing a image file in the memory, control the communication unit to transmit a image file to the server from the electronic device after establishing the network connection with the server, obtain a link information for downloading the image file from the server after establishing the network connection with the server, and after establishing the network connection with the server, replace the image file with a lower resolution image corresponding to the image file in the memory based at least on a memory capacity available in the memory.

19 Claims, 24 Drawing Sheets

(51) Int. Cl.
*G06F 16/178* (2019.01)
*G06F 11/14* (2006.01)

(58) Field of Classification Search
CPC ......... G06F 17/30858; G06F 17/30867; G06F 16/40; G06F 16/25; G06F 16/254; G06F 16/178; G06F 11/1458; H04L 67/1097
USPC .................................. 707/756, 826, 827, 825
See application file for complete search history.

(56) References Cited

U.S. PATENT DOCUMENTS

| | | |
|---|---|---|
| 7,965,906 B2 | 6/2011 | Teshima |
| 8,670,636 B2 | 3/2014 | Teshima |
| 9,584,623 B2 | 2/2017 | Kim et al. |
| 9,600,862 B2 | 3/2017 | Teshima |
| 2002/0196372 A1* | 12/2002 | Ito .......................... G06T 17/00 348/700 |
| 2003/0158916 A1 | 8/2003 | Cronin, III et al. |
| 2004/0066419 A1 | 4/2004 | Pyhalammi |
| 2004/0151311 A1 | 8/2004 | Hamberg et al. |
| 2005/0050043 A1* | 3/2005 | Pyhalammi ....... G06F 17/30265 |
| 2005/0144221 A1 | 6/2005 | Shin et al. |
| 2007/0185972 A1 | 8/2007 | Won et al. |
| 2009/0005032 A1* | 1/2009 | Lunati ................. G06F 17/3028 455/426.1 |
| 2009/0100096 A1* | 4/2009 | Erlichson ................ H04L 67/02 |
| 2009/0177942 A1* | 7/2009 | Hannuksela .......... H04L 1/0084 714/752 |
| 2010/0332547 A1* | 12/2010 | Manea .................... G06F 16/29 707/802 |
| 2011/0047190 A1 | 2/2011 | Lee et al. |
| 2011/0209221 A1 | 8/2011 | Hanson et al. |
| 2012/0050575 A1 | 3/2012 | Choe et al. |
| 2012/0131446 A1* | 5/2012 | Park ..................... G06F 16/9577 715/238 |
| 2013/0212540 A1* | 8/2013 | Krishnamurthy ....... G06F 16/54 715/854 |
| 2016/0063679 A1 | 3/2016 | Teshima |

FOREIGN PATENT DOCUMENTS

| | | |
|---|---|---|
| JP | 2010-187247 A | 8/2010 |
| KR | 2003-0077245 A | 10/2003 |
| KR | 10-2005-0034508 A | 4/2005 |
| KR | 10-2007-0095610 A | 10/2007 |
| KR | 10-2010-011547 A | 10/2010 |
| KR | 10-2010-0115547 A | 10/2010 |
| KR | 10-2011-0020147 A | 3/2011 |
| KR | 10-2011-0047869 A | 5/2011 |
| KR | 10-2013-0097443 A | 9/2013 |

\* cited by examiner

ORIGINAL IMAGE
RESOLUTION : 2048X1536

OPTIMIZED IMAGE
RESOLUTION : 640 x 480

ORIGINAL IMAGE
FILE FORMAT : BITMAP(BMP)
COMPRESSION RATIO : LOW

OPTIMIZED IMAGE
FILE FORMAT : JPEG
COMPRESSION RATIO : HIGH

OPTIMIZED VIDEO
RESOLUTION : 400X240

ORIGINAL VIDEO
FILE FORMAT : AVI
COMPRESSION RATIO : NORMAL

EDITABLE FILE

METHOD AND APPARATUS FOR FILE MANAGEMENT

CLAIM OF PRIORITY

The present application is related to and claims the benefit under 35 U.S.C. § 119(a) of a Korean patent application No. 10-2013-0123347 filed in the Korean Intellectual Property Office on Oct. 16, 2013, the entire disclosure of which is hereby incorporated by reference.

BACKGROUND

1. Field of the Disclosure

The present disclosure relates to electronic devices and more particularly to a method and apparatus for file management.

2. Description of Related Art

Nowadays, as multimedia technology develops, electronic devices having various functions are available. Smartphones, in particular, may include a display module and a high pixel camera module and may have the ability to capture still pictures and video. Further, smartphones may reproduce multimedia contents such as music and video and perform web surfing by connecting to a network. However, at present, the need exists for new file management services to be made available on smartphones and other electronic devices.

SUMMARY

The present disclosure addresses this need. According to aspects of the disclosure, a method in an electronic device is provided, the method comprising: connecting to a storage device; transmitting a first file to the storage device; when the first file is transmitted to the storage device, generating, a second file based on the first file and replacing the first file with the second file, wherein the second file is an optimized version of the first file.

According to aspects of the disclosure, a method in an electronic device is provided, the method comprising: connecting to a storage device; transmitting a first file to the storage device; when the first file is transmitted to the storage device, receiving from the storage device a second file, wherein the second file is an optimized version of the first file; and replacing the first file with the second file.

According to aspects of the disclosure, an electronic device is provided comprising a processor configured to: establish a network connection with a storage device; transmit a first file to the storage device; and when the first file is transmitted to the storage device, generate, a second file based on the first file and replace the first file with the second file, wherein the second file is an optimized version of the first file.

According to aspects of the disclosure, an electronic device is provided comprising a processor configured to: establish a network connection with a storage device; transmit a first file to the storage device; when the first file is transmitted to the storage device, receive from the storage device a second file, wherein the second file is an optimized version of the first file; and replace the first file with the second file.

BRIEF DESCRIPTION OF THE DRAWINGS

The above and other aspects, features and advantages of various aspects of the present disclosure will be more apparent from the following detailed description taken in conjunction with the accompanying drawings, in which.

DETAILED DESCRIPTION

Figure 1A:
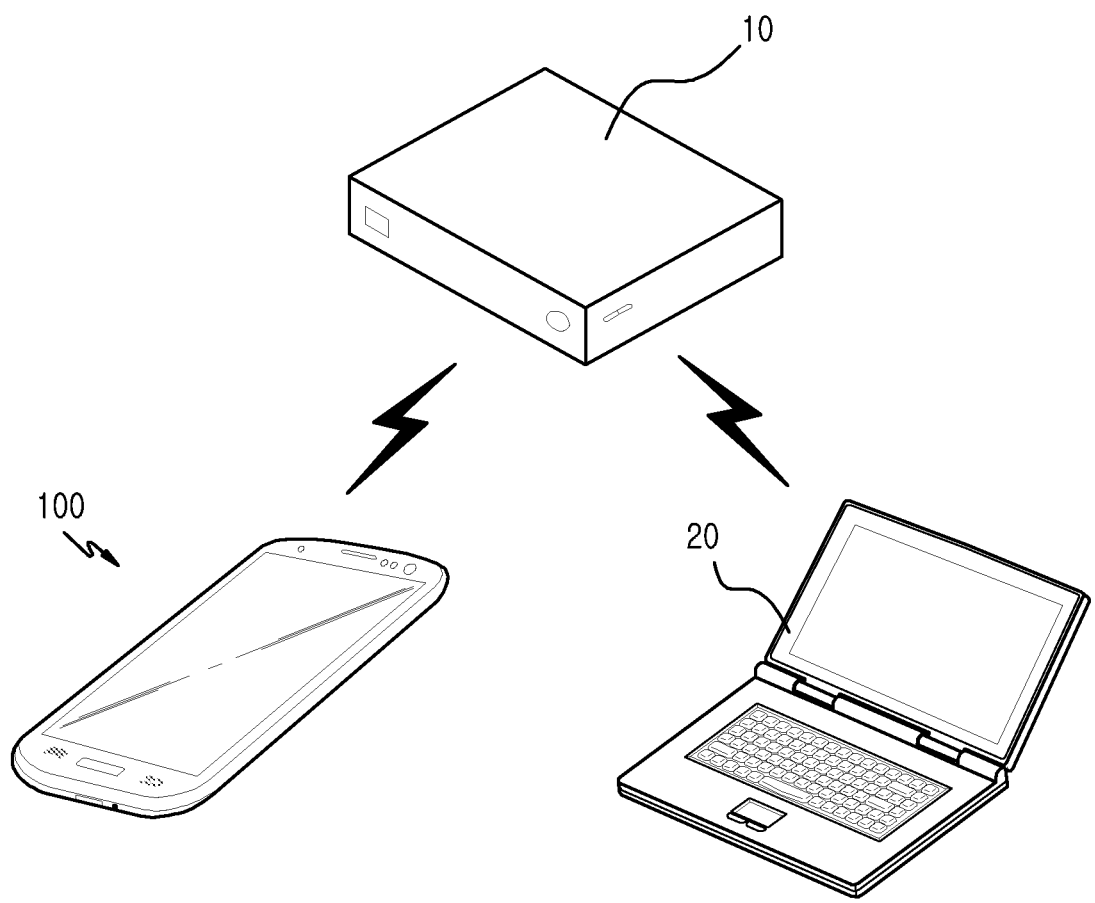
FIG. 1A and FIG. 1B are diagrams illustrating an example of a system, according to aspects of the disclosure.

According to aspects of the disclosure, a file management technique is provided for use in mobile terminals and other electronic devices. According to one aspect of the disclosure, a copy of an original file is uploaded by a mobile terminal to a remote storage device. After the original file is uploaded to the remote storage device, an optimized file corresponding to the original file is generated. The optimized file may be a version of the original file that is different from the original file in at least one aspect. For example, the optimized file may be smaller in size than the original file or the optimized file may have at least one of its attributes (e.g., read/write attributes) set differently from the original file. After the optimized file is generated, the original file can be deleted from the memory of the mobile terminal and only the optimized file can be retained in the memory of the mobile terminal.

According to aspects of the disclosure, the optimized file may be generated by either one of the mobile terminal and the remote storage device. In some implementations, the optimized file may be provided to the mobile terminal by the storage device upon the storage device receiving a copy of the original file. Thus, when a backup copy of the original file is stored at the storage device, the storage device may respond by returning an optimized version of the original file to mobile terminal.

According to aspects of the disclosure, the optimized file may be generated based on environment information of the mobile terminal. The environment information may identify processing power, memory space available, and or any other suitable characteristic of the hardware and/or software environment of the mobile terminal. Thus, if the mobile terminal has a low-resolution display and the original file is an image, the optimized file may be generated in such a way so that its resolution does not exceed the native resolution of the mobile terminal's display.

According to aspects of the disclosure, the optimized file may be associated with link information for retrieving the original file from the storage device. The link information may include any suitable identifier for retrieving the original file from the remote storage device, such as a Uniform Resource Locator, mapping number, etc. In some instances, the link information may be encoded directly into the optimized file.

According to aspects of the disclosure, the optimized file may be provided back to the mobile terminal when the optimized file is displayed and a predetermined input to the optimized file is sensed. For example, if the optimized file is read-only and the original file is editable, when a user attempts to edit the optimized file, the original file may be automatically retrieved from the storage device by the mobile terminal and displayed in place of the optimized file. In some implementations, the original file may be retrieved from the storage device based on information that is embedded into the optimized file.

Figure 1B:
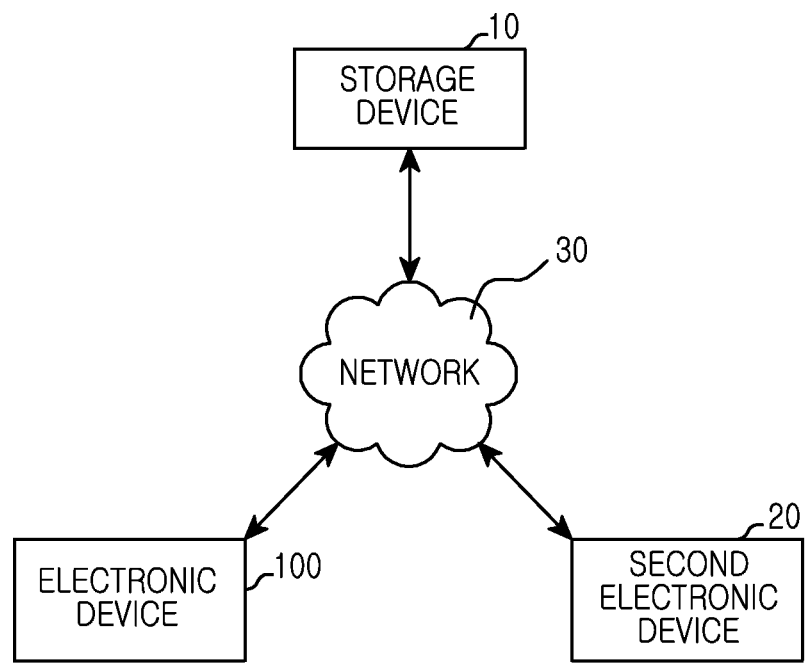

FIGS. 1A and 1B are diagrams illustrating an example of a system, according to aspects of the disclosure. As illustrated, the system includes a storage device 10, an electronic device 100, a second electronic device 20, and a network 30. The electronic device 100 and/or the second electronic device 20 may be connected to the storage device 10 via the network 30.

The storage device 10 may include a separate storage device such as a cloud server connected to the electronic device 100 by the network 30, a Network Attached Storage (NAS) device, a Home sync device, and/or any other suitable type of peripheral device. The electronic device 100 may include any suitable type of electronic device, such as a PDA, a laptop computer, a mobile phone, a smart phone, a netbook computer, a television, an MID, a UMPC, a tablet PC, a wrist watch, a camera device, a navigation device, and an MP3 player. Similarly, the second electronic device 20 may also include any suitable type of electronic device, such as a PDA, a laptop computer, a mobile phone, a smart phone, a netbook computer, a television, an MID, a UMPC, a tablet PC, a wrist watch, a camera device, a navigation device, and an MP3 player.

The network 30 may include one or more of a wired network and a wireless network. For example, the network 30 may include at least one network of a Global System for Mobile Communication (GSM) network, an Enhanced Data GSM Environment (EDGE) network, a Code Division Multiple Access (CDMA) network, a Wideband Code Division Multiple Access (W-CDMA) network, a Long Term Evolution (LTE) network, an Orthogonal Frequency Division Multiple Access (OFDMA) network, a Wi-Fi network, a WiMax network, a Near Field Communication (NFC) network, an infrared ray communication network, a Bluetooth network, and/or any other suitable type of network.

Figure 2A:
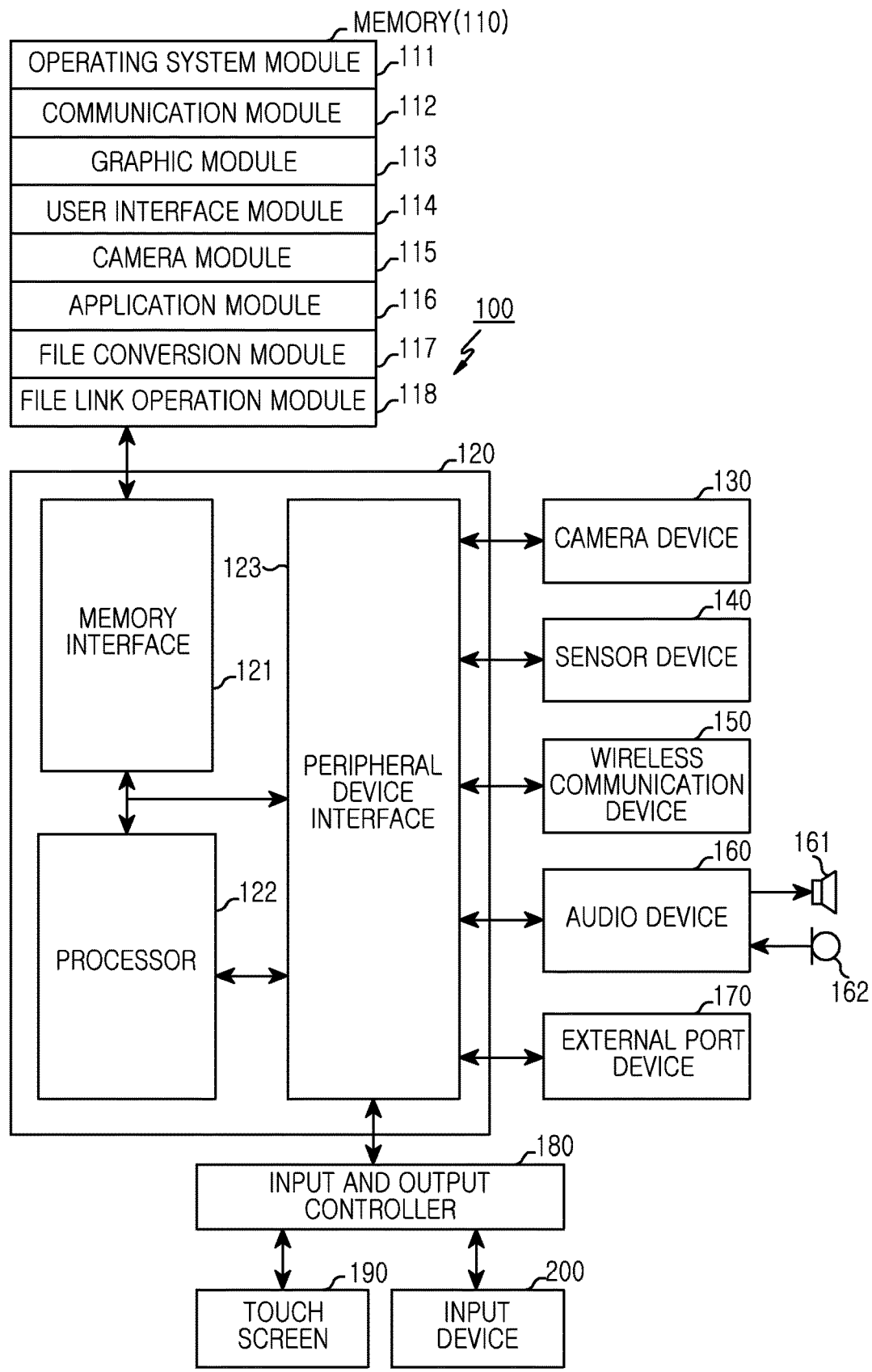
FIG. 2A is a block diagram of an example of the electronic device 100, according to aspects of the disclosure.

FIG. 2A is a block diagram of an example of the electronic device 100, according to aspects of the disclosure. As illustrated, the electronic device 100 may include a memory 110, a processor unit 120, a camera device 130, a sensor device 140, a wireless communication device 150, an audio device 160, an external port device 170, an input and output controller 180, a touch screen 190, and an input device 200. The memory 110 and the external port device 170 may be formed in plural.

The processor unit 120 may include one or more of an x86 processor, an ARM-based processor, a MIPS based processor, a Field-Programmable Gate Array (FPGA), a Special Purpose Integrated Circuit (ASIC), and/or any other suitable type of processing circuitry. In some implementations, the processor unit 120 may include a memory interface 121, at least one processor 122, and a peripheral device interface 123. Here, the memory interface 121, the at least one processor 122, and the peripheral device interface 123 included in the processor unit 120 may be integrated into at least one integrated circuit or may be implemented with a separate constituent element.

The memory interface 121 may control access of the processor 122 or the peripheral device interface 123 to the memory 110.

The peripheral device interface 123 may control a connection to the memory interface 121, the processor 122, and an input and output peripheral device of the electronic device 100.

The processor 122 may control the electronic device 100 to provide various multimedia services using at least one software program. By executing at least one program stored at the memory 110, the processor 122 may provide a service corresponding to the program.

By executing several software programs, the processor 122 may perform several functions for the electronic device 100 and perform a processing and control for audio dedicated communication, audiovisual communication, and data communication. Further, by interlocking with software modules stored at the memory 110, the processor 122 may perform various ones of the techniques discussed with respect to FIGS. 3-16B.

The processor 122 may include at least one data processor, image processor, or Coder and Decoder (CODEC). Further, the electronic device 100 may separately form a data processor, an image processor, or a CODEC.

Various constituent elements of the electronic device 100 may be connected through at least one communication bus (not shown) or an electrical connection means (not shown).

The camera device 130 may perform a camera function of a picture, video clip, and recording. The camera device 130 may include a Charged Coupled Device (CCD) or a Complementary Metal-Oxide Semiconductor (CMOS). Further, the camera device 130 may change a hardware configuration, for example, may adjust a lens movement and the number of apertures according to a camera program in which the processor 122 executes.

The camera device 130 may provide images acquired by photographing a subject to the processor unit 120. The camera device 130 may include an image sensor that converts an optical signal to an electrical signal, an image signal processor that converts an analog image signal to a digital image signal, and a digital signal processor that performs an image processing to display an image signal output from the image signal processor on the touch screen 190.

The sensor device 140 may include a proximity sensor, a hall sensor, an illumination sensor, and a motion sensor. For example, the proximity sensor may detect an object approaching the electronic device 100, and the hall sensor may detect a magnetic force of a metal body. Further, the illumination sensor may detect light of a periphery of the electronic device 100, and the motion sensor may include an acceleration sensor or a gyro sensor that detects a motion of the electronic device 100. However, the sensor device 140 is not limited thereto and may further include various sensors for implementing well-known other additional functions.

The wireless communication device 150 enables to perform wireless communication and may include a radio frequency transmitter and receiver or a light (e.g., infrared rays) transmitter and receiver. Although not shown, the wireless communication device 150 may include a Radio Frequency Integrated Circuit unit (RF IC unit) and a baseband processor. The RF IC unit may transmit and receive electromagnetic waves, convert a baseband signal from the baseband processor to electromagnetic waves, and transmit the electromagnetic waves through an antenna.

The RF IC unit may include an RF transceiver, an amplifier, a tuner, an oscillator, a digital signal processor, a CODEC chipset, and a Subscriber Identity Module (SIM) card.

The wireless communication device 150 may operate through at least one of a GSM network, an EDGE network, a CDMA network, a W-CDMA network, an LTE network, an OFDMA network, a Wi-Fi network, a WiMax network, an NFC network, an Infrared Ray Communication network, and a Bluetooth network according to a communication network. However, the wireless communication device 150 is not limited thereto and may use several communication methods through a protocol for an email, instant messaging, or a Short Message Service (SMS).

The audio device 160 may be connected to a speaker 161 and a microphone 162 to perform an audio input and output function such as a speech recognition, voice duplication, digital recording, or communication function. The audio device 160 may provide an audio interface between a user and the electronic device 100, convert a data signal received from the processor 122 to an electric signal, and output the converted electric signal through the speaker 161.

The speaker 161 may convert and output an electric signal to an audible frequency band and be disposed at the front side or the rear side of the electronic device 100. The speaker 161 may include a flexible film speaker in which at least one piezo-electric body is attached to a vibration film.

The microphone 162 may convert a sound wave transferred from a person or other sound sources to an electric signal. The audio device 160 may receive an electric signal from the microphone 162, convert the received electric signal to an audio data signal, and transmit the converted audio data signal to the processor 122. The audio device 160 may include an earphone, an ear set, a headphone, or a headset that may be attached to the electronic device 100 or that may be detached from the electronic device 100.

The external port device 170 may directly connect the electronic device 100 to another electronic device or may be indirectly connected to another electronic device through a network (e.g., Internet, Intranet, or wireless local area network (LAN)). The external port device 170 may include a Universal Serial Bus (USB) port or a FIREWIRE port.

The input and output controller 180 may provide an interface between the peripheral device interface 123 and an input and output device such as the touch screen 190 and the input device 200. The input and output controller 180 may include a touch screen controller and another input device controller.

The touch screen 190 may provide an input and output interface between the electronic device 100 and a user. The touch screen 190 may transfer a user's touch information to the processor 122 using touch detection technology and show visual information, text, graphic, or video provided from the processor 122 to a user.

The touch screen 190 may display state information of the electronic device 100, a moving picture, a still picture, and a character in which the user inputs. Further, the touch screen 190 may display application related information driven by the processor 122.

The touch screen 190 may use random multi-touch detection technology including other adjacent sensor arrangement or other elements as well as capacitive, resistive, infrared ray, and surface sound wave technology. Such a touch screen 190 may use at least one of a Liquid Crystal Display (LCD), an Organic Light-Emitting Diode (OLED), an Active Mode Organic Light Emitting Diode (AMOLED), a Thin Film Transistor-Liquid Crystal Display (TFT-LCD), a Flexible Display, and a three-dimensional display (3D).

The touch screen 190 may recognize a touch through a change of a physical quantity (e.g., capacitance and resistance) according to a contact of a finger or a stylus and detect an action of flicking, touch and drag, tab and hold, and a multi tab. Further, the touch screen 190 may recognize a hovering input (may be referred to as a non-contact touch or a proximity touch) that detects that an input means such as a finger or a stylus approaches into a predetermined distance from the touch screen 190.

The input device 200 may provide input data generated by a user selection to the processor 122 through the input and output controller 180. The input device 200 may include a keypad including at least one hardware button and a touch pad that detects touch information.

The input device 200 may include a up/down button for a volume control and may further include at least one of pointer devices such as a push button, a locker button, a locker switch, a thumb-wheel, a dial, a stick, a mouse, a track-ball, or a stylus in which a corresponding function is given.

The memory 110 may include a high speed Random Access Memory (RAM) or a non-volatile memory such as at least one magnetic disk storage device, at least one light storage device, or a flash memory (e.g., NAND, NOR).

The memory 110 stores software. In some implementations, the software may include an operating system module 111, a communication module 112, a graphic module 113, a user interface module 114, a camera module 115, an application module 116, a file conversion module 117, and a file link operation module 118. A term of a module may be represented with a set of instructions, an instruction set, or a program.

The operating system module 111 may include a built-in operation system such as WINDOWS, LINUX, Darwin, RTXC, UNIX, OS X, Android or VxWorks and include several software components that control a general system operation. A control of such a general system operation may include memory control and management, storage hardware (device) control and management, and power control and management. Further, the operating system module 111 may perform a function of smoothly enabling to perform communication between several hardware (device) and a software component (module).

The communication module 112 may enable to perform communication with another electronic device such as a computer, a server, and an electronic device through the wireless communication device 150 or the external port device 170.

The graphic module 113 may include several software components for providing and displaying graphic to the touch screen 190. A term of graphic may indicate a text, a web page, an icon, a digital image, video, and animation.

The user interface module 114 may include several software components related to a user interface. The user interface module 114 may control to display application related information driven by the processor 122 on the touch screen 190. Further, the user interface module 114 may include contents on a change of a user interface state or a condition in which a user interface state is changed.

The camera module 115 may include several software components for performing a camera function.

The application module 116 may include a software component of at least one application installed in the electronic device 100. Such an application may include a browser, an email, a phonebook, a game, a Short Message Service (SMS), a Multimedia Message Service (MMS), a Social Networking Service (SNS), an instant message, a wake-up call, an MP3 player, a scheduler, a drawing board, a camera, word processing, keyboard emulation, a music player, an address book, a contact list, a widget, digital copyright management (DRM), speech recognition, voice duplication, a location determination function, and a location based service. A term of an application may be represented with an application program.

The file conversion module 117 may include a software component for optimizing an original file. The file conversion module 117 may include a related instruction and process for performing various operations for reducing a file capacity of an original file.

The file link operation module 118 may include link information for receiving an original file or a backup copy of the original file stored at the storage device 10. The link information may include a mapping number or a link path for receiving an original file or a backup copy of the original file by accessing the storage device 10, and the file link operation module 118 may include a software component for operating a mapping table.

The processor unit 120 may further include an additional module (instructions) in addition to the above-described module.

Various functions of the electronic device 100 may be executed by hardware or software including at least one processing or Application Specific Integrated Circuit (ASIC).

Although not shown, the electronic device 100 may include a power system that supplies power to several constituent elements included in the electronic device 100. The power system may include a power source (AC power source or battery), a power error detection circuit, a power converter, a power inverter, a charge device, or a power state display device (light emitting diode). Further, the electronic device 100 may include a power management and control device that performs a function of generating, managing, and distributing power.

Figure 2B:
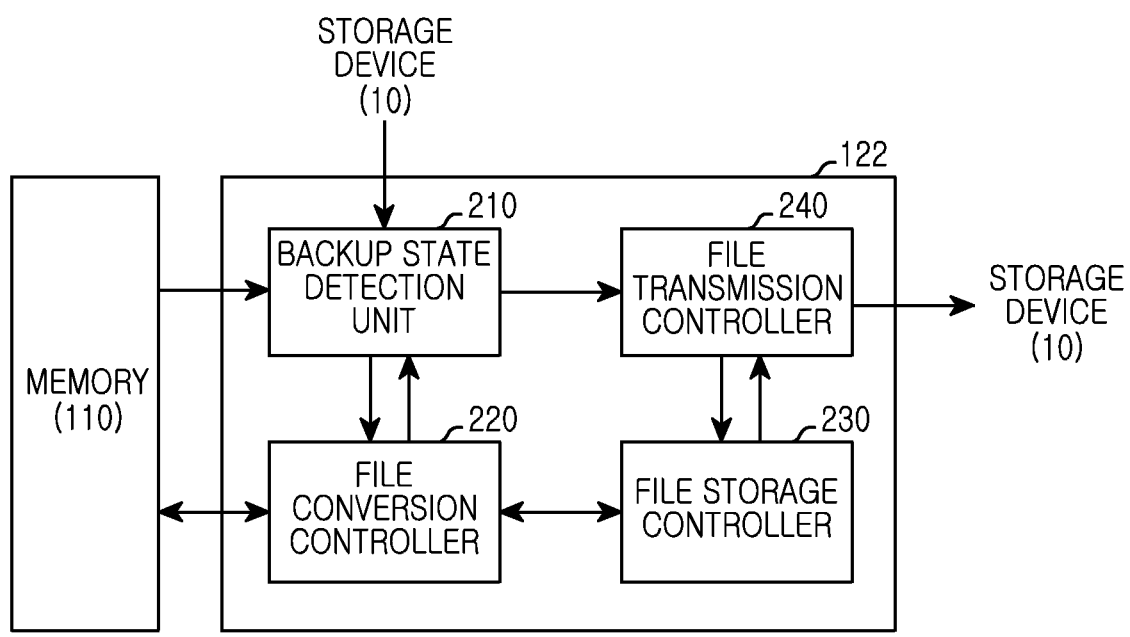
FIG. 2B is a block diagram illustrating an example of a configuration of the processor 122, according to aspects of the disclosure.

FIG. 2B is a block diagram illustrating an example of a configuration of the processor 122 according to aspects of the disclosure. As illustrated, the processor 122 may include a backup state detection unit 210, a file conversion controller 220, a file storage controller 230, and a file transmission controller 240. Each of the backup state detection unit 210, the file conversion controller 220, the file storage controller 230, and the file transmission controller 240 may be implemented in software (e.g., via one or more processor instructions), in hardware (e.g., via one or more dedicated or shared electronic circuits), and/or as a combination of hardware and software. Although the backup state detection unit 210, the file conversion controller 220, the file storage controller 230, and the file transmission controller 240 are depicted as discrete modules, in some implementations two or more of them may be integrated together.

The file transmission controller 240 may transmit an original file stored at the memory 110 of the electronic device 100 to the storage device 10. For example, when the electronic device 100 is connected to the storage device 10 by wire or wireless, the file transmission controller 240 may control to transmit an original file to the storage device 10.

The backup state detection unit 210 may determine whether backup of the original file transmitted from the electronic device 100 to the storage device 10 is complete. For example, when backup of an original file to the storage device 10 is complete, the backup state detection unit 210 may receive a backup completion signal corresponding to the original file from the storage device 10. Additionally or alternatively, when backup of an original file at the storage device 10 is complete, the backup state detection unit 210 may transmit a backup completion signal corresponding to the original file to the storage device 10 or may provide a backup completion signal to the file conversion controller 220.

The backup state detection unit 210 may provide the backup completion signal received from the storage device 10 to the file conversion controller 220.

The file conversion controller 220 may execute the file conversion module 117 stored at the memory 110 and optimize an original file to produce an optimized file. For example, when backup of an original file to the storage device 10 is complete, the file conversion controller 220 may compress the original file to produce an optimized file. The original file may include an image file, a video file, a text file, a sound file, and/or any other suitable type of file.

Figure 9A:
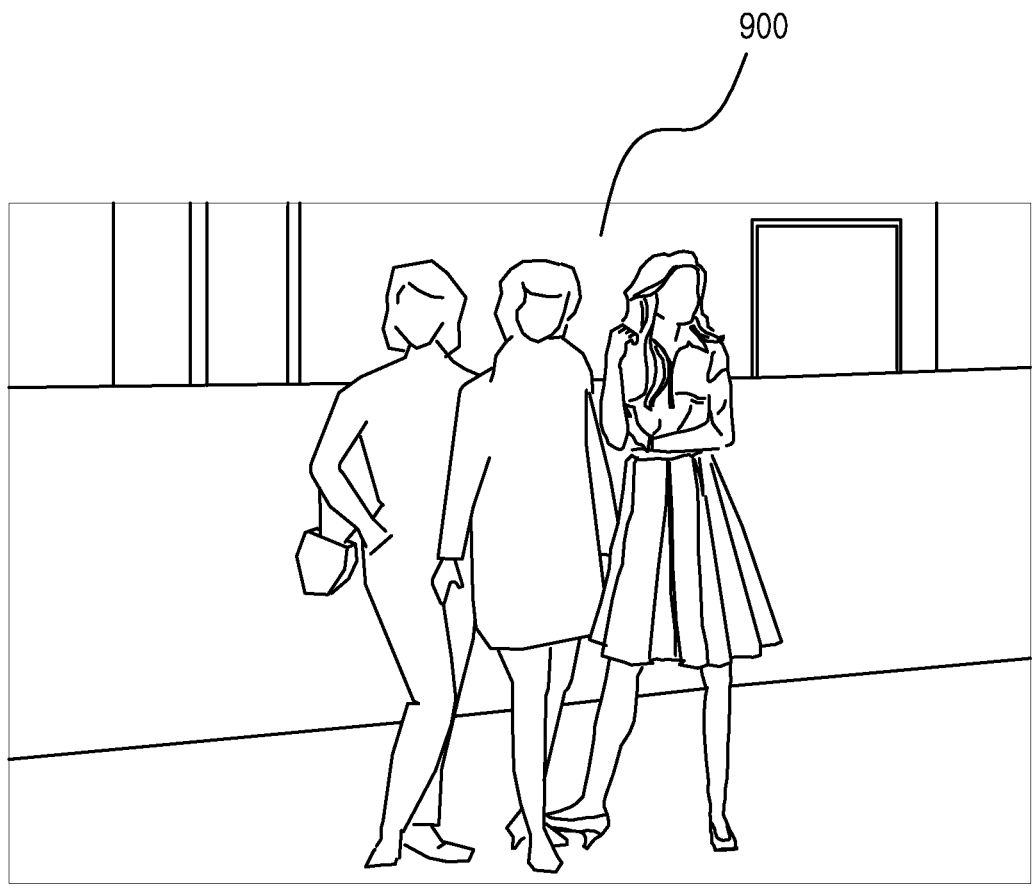
FIG. 9A and FIG. 9B are diagrams illustrating an example of a technique for optimizing an original file to produce an optimized file.
Figure 9B:
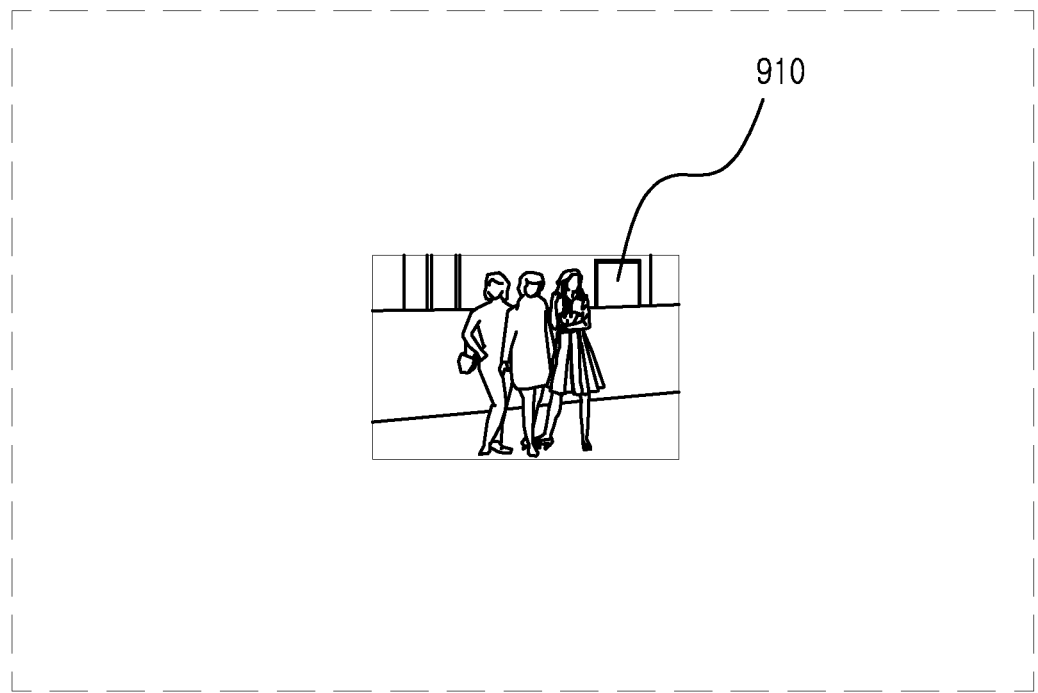

FIGS. 9A-B are diagrams illustrating an example of a technique for optimizing an original file to produce an optimized file. As shown in FIGS. 9A and 9B, the electronic device 100 may convert an original image 900 having a resolution of 2048*1536 to an optimized image 910 having a resolution of 640*480. In some implementations, after a copy of the original image 900 is stored on the storage device 10, the electronic device 100 may delete the original image 900 from the memory of the electronic device 100 and store the optimized image 910 in its place. By doing so, the electronic device 100 may reduce the memory space needed to store the image. In some implementations, the resolution of the optimized image 910 may be set by the user.

Figure 10A:
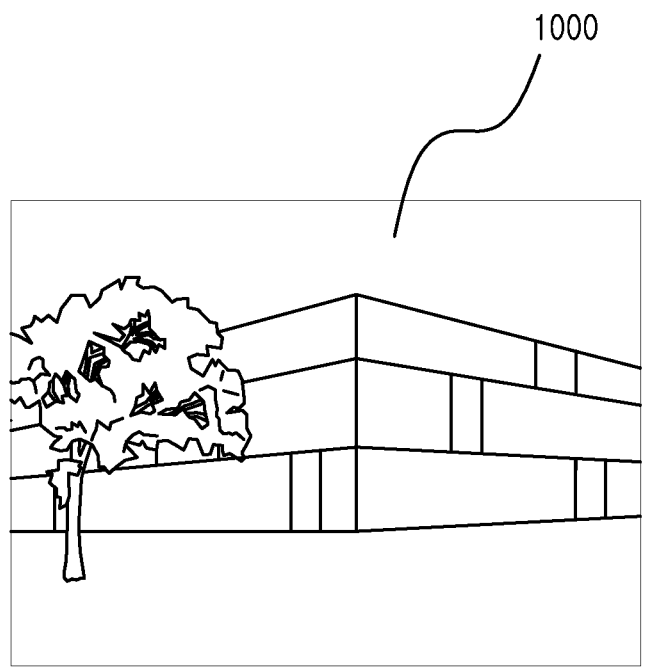
FIG. 10A and FIG. 10B are diagrams illustrating an example of a technique for optimizing an original file to produce an optimized file.
Figure 10B:
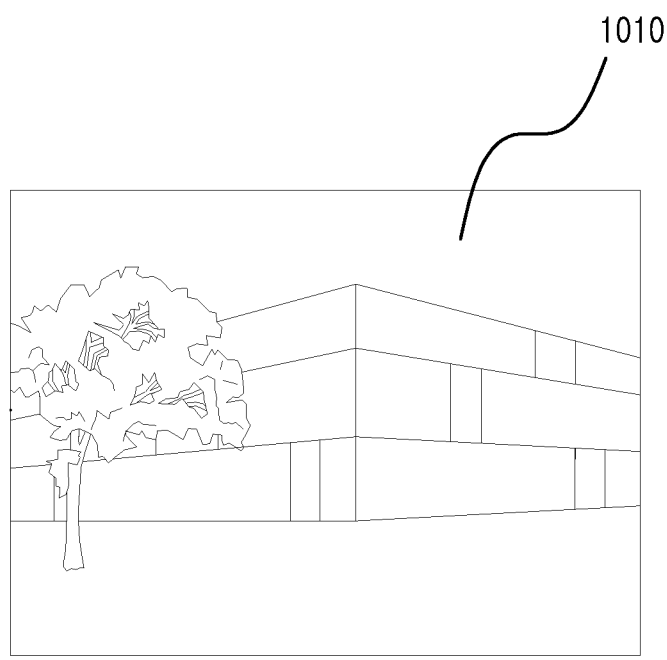

FIGS. 10A-B are diagrams illustrating an example of a technique for optimizing an original file to produce an optimized file. As shown in FIGS. 10A and 10B, the electronic device 100 may compress an original image file 1000 that is stored in a Bitmap (BMP) format to produce an optimized image file 1010 that is stored in the Joint Photographic coding Experts Group (JPEG) format. Because the JPEG format has a high compression ratio in comparison to the Bitmap format, the optimized image file 1010 may occupy less memory space than the original image file 1000. Additionally or alternatively, in some implementations, the electronic device 100 may increase the compression ratio of the original image file 1000 without changing the file's format. It is to be understood that any suitable compression technique may be used to compress the original image file 1000.

Figure 11A:
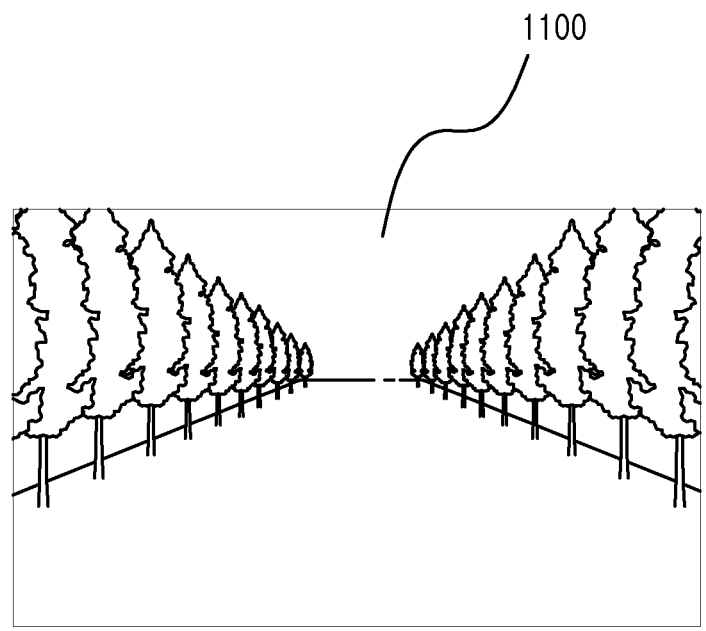
FIG. 11A and FIG. 11B are diagrams illustrating an example of a technique for optimizing an original file to produce an optimized file.
Figure 11B:
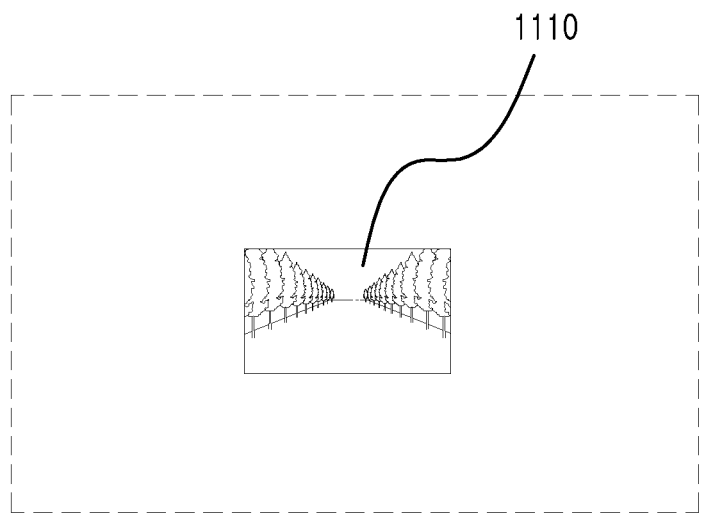

FIGS. 11A-B are diagrams illustrating an example of a technique for optimizing an original file to produce an optimized file. As shown in FIGS. 11A and 11B, the electronic device 100 may convert an original video file 1100 having a resolution of 1280*720 to an optimized video file 1110 having a resolution of 400*240 and store the optimized video file 1110 as a replacement to the original file. In some implementations, the resolution to which the original video file 1100 is converted may be set by the user.

Figure 12A:
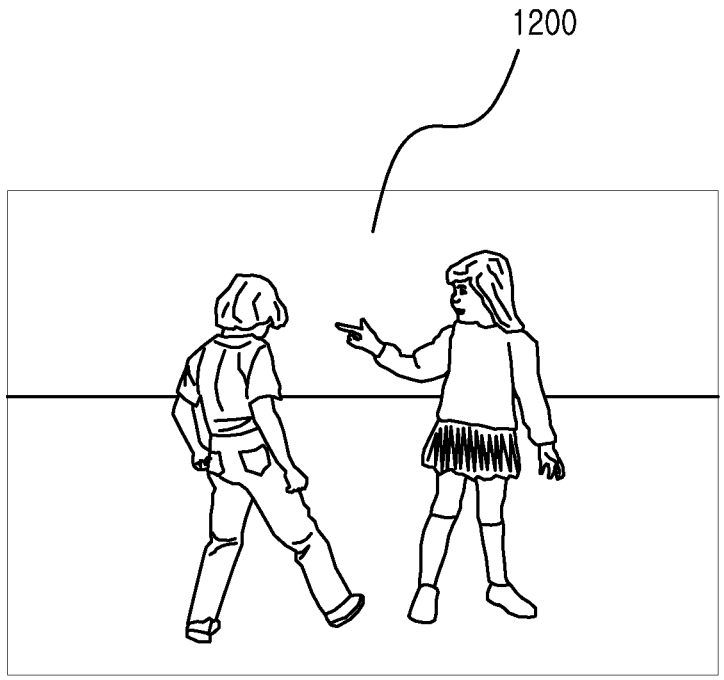
FIG. 12A and FIG. 12B are diagrams illustrating an example of a technique for optimizing an original file to produce an optimized file.
Figure 12B:
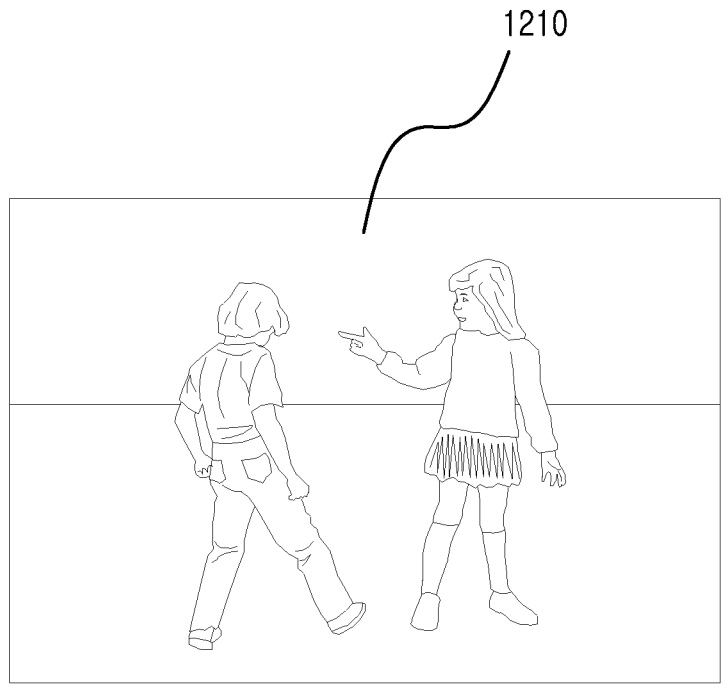

FIGS. 12A-B are diagrams illustrating an example of a technique for optimizing an original file to produce an optimized file. As shown in FIGS. 12A and 12B, the electronic device 100 may compress an original video file 1200 that is encoded in the Audio Video Interleaved (AVI) format to produce an optimized video file 1210 that is encoded in the Quick Time Movie (MOV) format. By doing so, the electronic device 100 may reduce the size of the original video file 1200. Although in this example the electronic device 100 increases the compression ratio of the original video file 1200 by changing the original file's encoding scheme, in other examples, the electronic device 100 may only change the compression ratio without changing the encoding scheme. Any suitable technique for encoding and/or compressing the original video file 1200 may be used.

Figure 13:
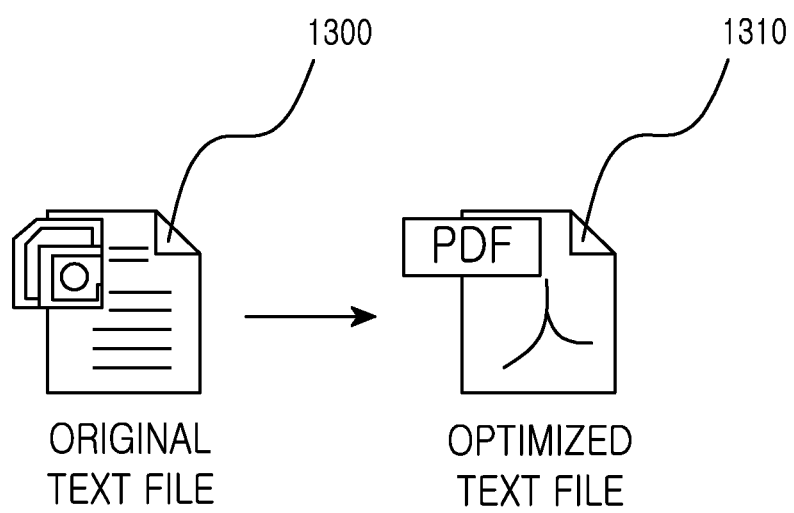
FIG. 13 is a diagram illustrating an example of a technique for optimizing an original file to produce an optimized file.

FIG. 13 is a diagram illustrating an example of a technique for optimizing an original file to produce an optimized file. As shown in FIG. 13, the electronic device 100 may convert an original text file 1300 encoded in the Document (DOC) file format to an optimized text file 1310 that is encoded in the Portable Document Format (PDF) file format. In some implementations, the optimized text file 1310 may have the same format as the original text file 1300. In such instances, the optimized text file 1310 may be a compressed version of the original text file 1300. Additionally or alternatively, in some implementations, optimizing the original text file 1300 to produce the optimized text file 1310 may include changing one or more attributes of the original text file. For example, the original text file 1300 may be editable while the optimized text file 1310 may be read-only.

Figure 3:
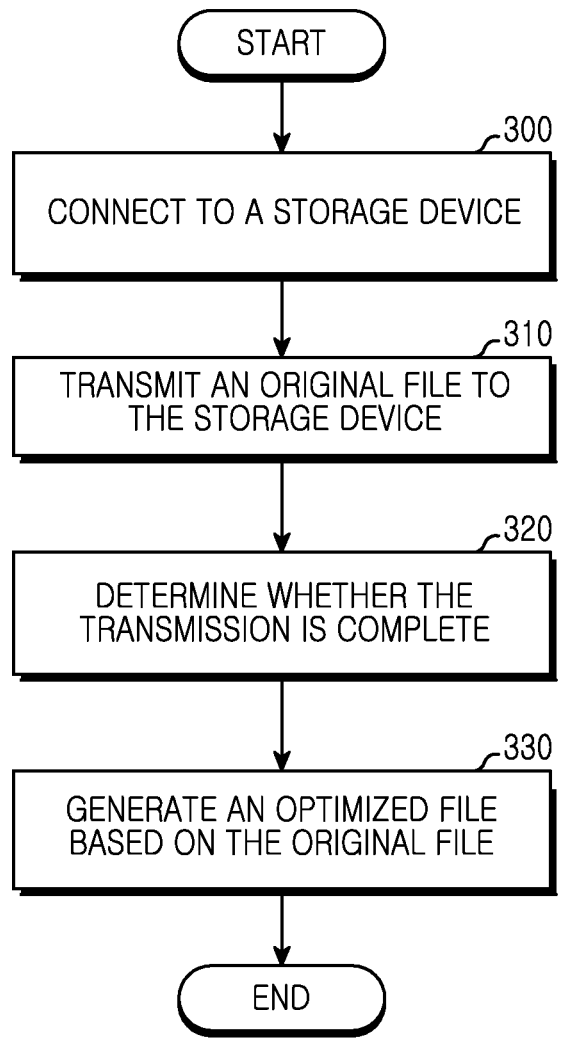
FIG. 3 is a flowchart of an example of a process, according to aspects of the disclosure.

FIG. 3 is a flowchart of an example of a process, according to aspects of the disclosure. According to the process, at operation 300, the electronic device 100 connects to the storage device 10.

At operation 310, the electronic device 100 transmits a copy of an original file stored at the electronic device 100 to the storage device 10.

At operation 320, the electronic device 100 determines whether the transmission of the original file is complete. In some implementations, the determination may be performed by using the backup state detection unit 210. If the transmission is complete, the backup state detection unit 210 may receive a backup completion signal from the storage device 10 indicating that the transmission has been completed. Additionally or alternatively, when the transmission of the original file is completed, the backup state detection unit 210 may transmit a backup completion signal to the storage device 10. Additionally or alternatively, when the transmission of the original file is completed, the backup state detection unit 210 may provide a backup completion signal to the file conversion controller 220.

At operation 330, the electronic device 100 generates an optimized file based on the original file. The electronic device 100 processes the original file to produce an optimized file. As discussed above, optimizing the original file may include one or more of:

(1) Changing the encoding scheme used to encode the content of the original file;
(2) Compressing the original file;
(3) Changing one or more attributes of the original file that specify whether the file can be edited.
(4) Changing a format of the original file; and
(5) Changing a resolution of media content that is stored in the original file.

In some implementations, operation 330 may be performed by the file conversion controller 220 of the electronic device 100. Although in this example the optimized file is generated by the electronic device 100, in other examples the optimized file may be received by the electronic device 100 from the storage device 10 after operation 320 is completed. Additionally or alternatively, in some implementations, the optimized file may be generated by the electronic device 100 based on environment information of the electronic device 100.

Figure 4:
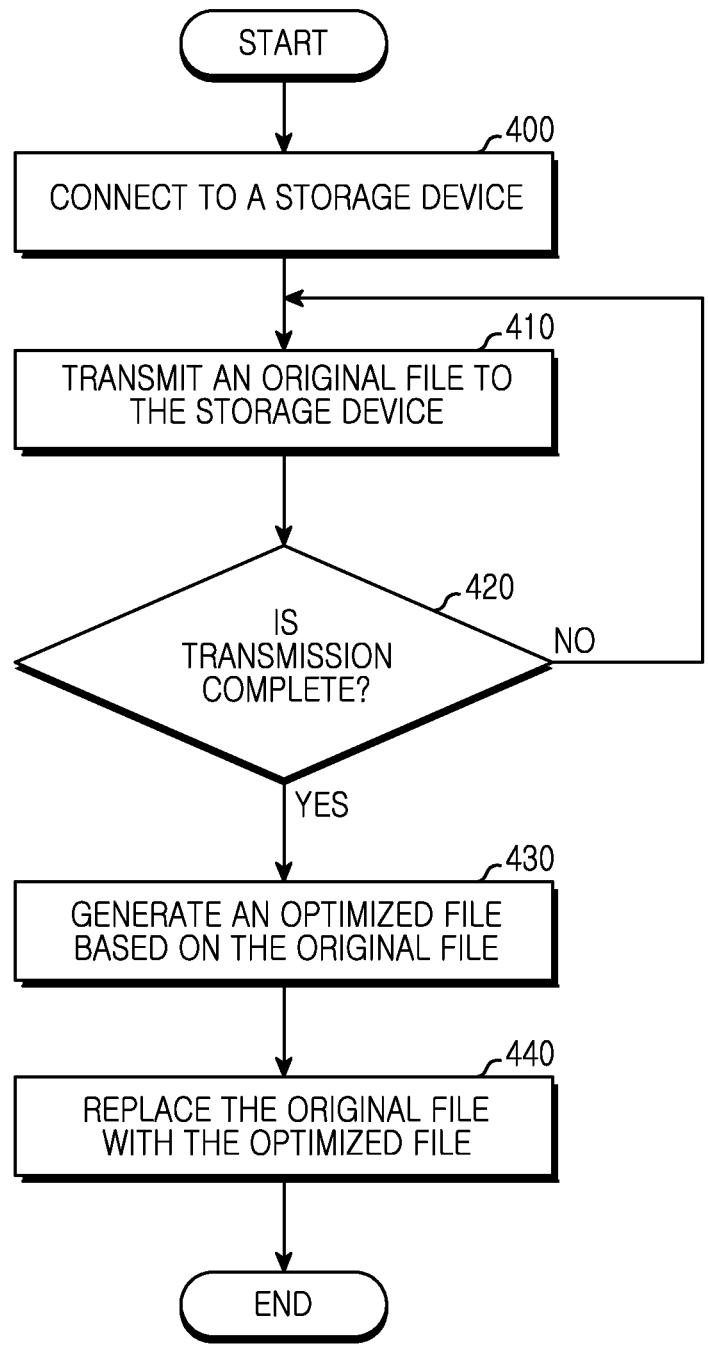
FIG. 4 is a flowchart of an example of a process, according to aspects of the disclosure.

FIG. 4 is a flowchart of an example of a process, according to aspects of the disclosure. According to the process, at operation 400, the electronic device 100 connects to the storage device 10. At operation 410, the electronic device 100 transmits original file to the storage device 10.

At operation 420, the electronic device 100 determines whether the transmission of the original file is complete. In some implementations, operation 420 may be performed in the same way as operation 320.

At operation 430, the electronic device 100 generates an optimized file based on the original file. The electronic device 100 obtains an optimized file corresponding to the original file. The optimized file may be an optimized version of the original file. As noted above, the optimized file may be generated by one or more of:

(1) Changing the encoding scheme used to encode the content of the original file;
(2) Compressing the original file;
(3) Changing one or more attributes of the original file that specify whether the file can be edited.
(4) Changing a format of the original file; and
(5) Changing a resolution of media content that is stored in the original file.

In some instances, the optimized file may be generated by the electronic device 100. For example, by executing the file conversion module 117 stored at the memory 110, the file conversion controller 220 of the electronic device 100 may generate an optimized version of the original file.

At operation 440, the electronic device 100 replaces the original file with the optimized file. In some implementations, replacing the original file with the optimized file may include deleting the original file from the memory (e.g., volatile and/or non-volatile memory) of the electronic device 100 and retaining only the optimized file in the memory of the electronic device 100.

Additionally or alternatively, in some implementations, replacing the original file with the optimized file may include associating the optimized file with link information for retrieving the original file from the storage device 10. The link information may include an Uniform Resource Identifier (URL) for retrieving the original file, a mapping number corresponding to the original file, a thumbnail corresponding to the original file, and/or any suitable identifier that can be used to retrieve the original file from the storage device 10.

In some implementations, the link information may be generated by the storage device 10. For example, in some instances, the storage device 10 may store a mapping table that relates mapping numbers with corresponding file paths. In such instances, the mapping number for the original file may be provided to the electronic device 100 by the storage device 10 as the link information. In some implementations, the storage device 10 may include a Uniform Resource Identifier (URL) identifying a path in the memory of the storage device 10 where the original file is stored. In some instances, the link information may be included in EXIF information, and/or other metadata, that is included in the optimized file.

According to various aspects of the disclosure, the link information may be stored in an image thumbnail form. In such a case, the storage device 10 may provide thumbnail information corresponding to a backup file to the electronic device 100. The electronic device 100 may receive a corresponding backup file using thumbnail information. For example, the backup file may include at least one image.

Figure 5:
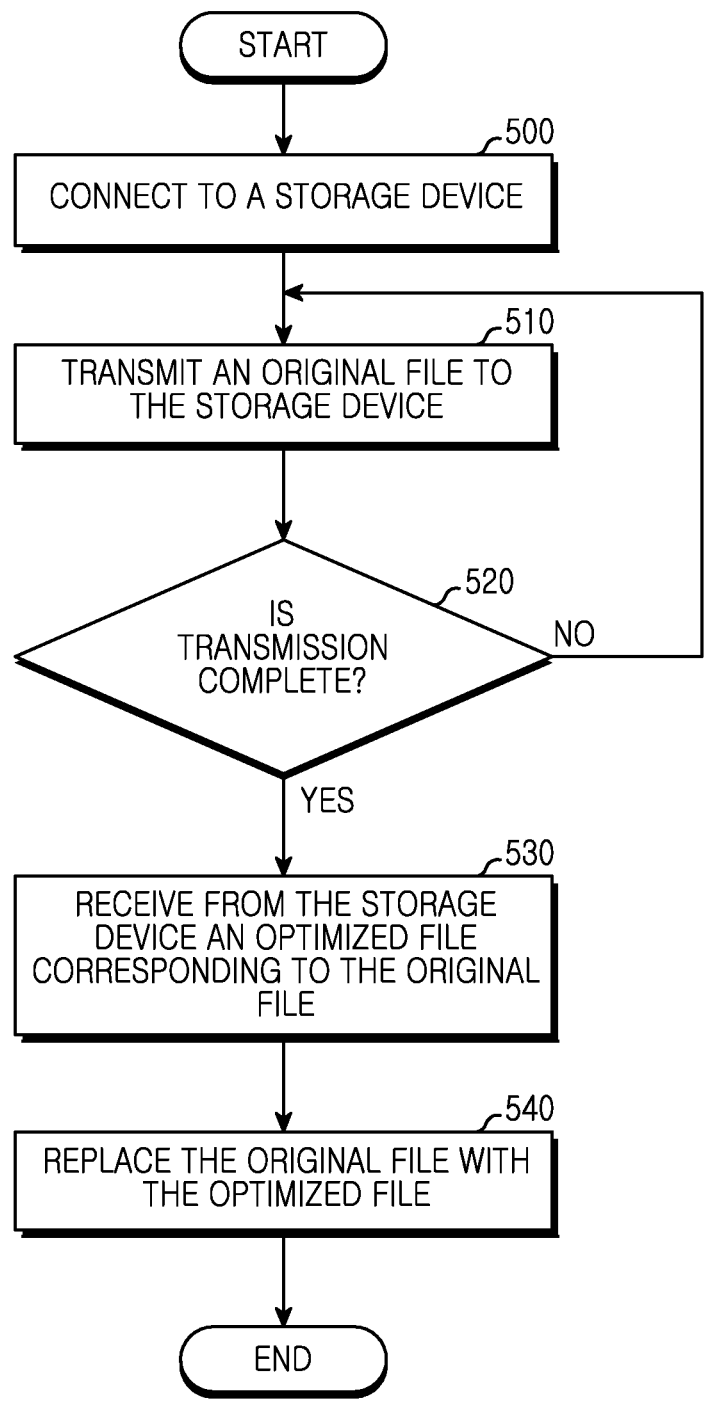
FIG. 5 is a flowchart of an example of a process according to aspects of the disclosure.

FIG. 5 is a flowchart of an example of a process according to aspects of the disclosure. According to the process, at operation 500, the electronic device 100 connects to the storage device 10. At operation 510, the electronic device 100 transmits a copy of an original file stored at the electronic device 100 to the storage device 10. At operation 520, the electronic device 100 determines whether the transmission is complete.

When the transmission is complete, at operation 530, the electronic device 100 receives from the storage device 10 an optimized file corresponding to the original file. The optimized file may be an optimized version of the original file. As noted above, the optimized file may be generated by one or more of:

(1) Changing the encoding scheme used to encode the content of the original file;
(2) Compressing the original file;
(3) Changing one or more attributes of the original file that specify whether the file can be edited.
(4) Changing a format of the original file; and
(5) Changing a resolution of media content that is stored in the original file.

In some implementations, the optimized file may be generated by the storage device 10 based on environment information for the electronic device. The environment information may identify any suitable characteristic of the software and/or hardware that is part of the electronic device, such as memory capacity, processor speed, usable memory capacity, transmission speed etc. In some implementations, the environment information may be provided to the storage device 10 by the electronic device 100. In some implementations, generating the optimized file based on the environment information may include setting (or selecting) a characteristic of the optimized file based on a characteristic of the electronic device. For example, a resolution of the optimized file may be set based on the storage capacity of the electronic device 100. If the electronic device 100 has a larger amount of memory space available, the optimized file may be generated to have higher resolution than otherwise. At operation 540, the electronic device 100 replaces the original file with the optimized file. In some implementations, operation 540 may be performed in the same way as operation 440.

Figure 6:
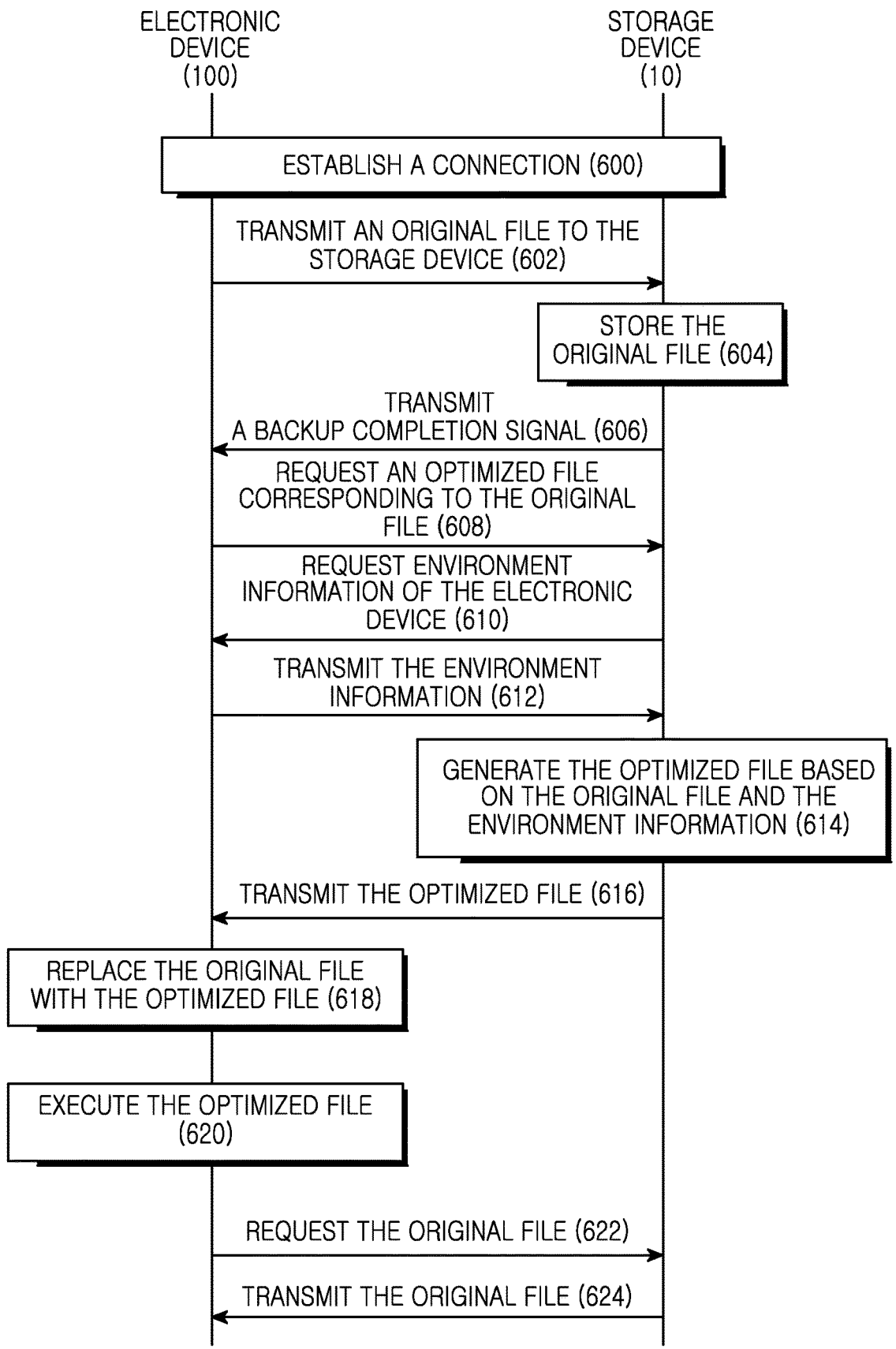
FIG. 6 is a flowchart of an example of a process according to aspects of the disclosure.

FIG. 6 is a flowchart of a process according to aspects of the disclosure. According to the process, at operation 600, the electronic device 100 connects to the storage device 10. At operation 602, the electronic device 100 transmits an original file to the storage device 10. At operation 604, the storage device 10 may store the original file. At operation 606, the storage device 10 transmits a backup completion signal to the electronic device 100. At operation 608, the electronic device 100 requests from the storage device 10 an optimized file corresponding to the original file (e.g., an optimized file that is generated based on the original file). At operation 610, the storage device 10 requests environment information of the electronic device 100 from the electronic device 100. In some implementations, environmental information may be requested when the storage device 10 determines that it has no environment information record for the electronic device 100 stored in its local memory. At operation 612, the electronic device 100 transmits the environment information to the storage device 10.

At operation 614, the storage device 10, generates an optimized file corresponding to the original file. As noted above the optimized file may be an optimized version of the original file. In some implementations, the optimized file may be generated based on environment information of the electronic device 100. At operation 616, the storage device 10 transmits the optimized file to the electronic device 100. At operation 618, the electronic device 100, stores the optimized file as a replacement to the original file.

At operation 620, the electronic device 100 executes the stored optimized file. Executing the optimized file may include displaying and/or otherwise outputting the optimized file. At operation 622, the electronic device 100 requests the original file from the storage device 10. In some implementations, the electronic device 100 may request the original file in response to detecting that a reference gesture is input to the optimized file. At operation 624, the storage device 10 transmits the original file in response to the request.

Figure 14A:
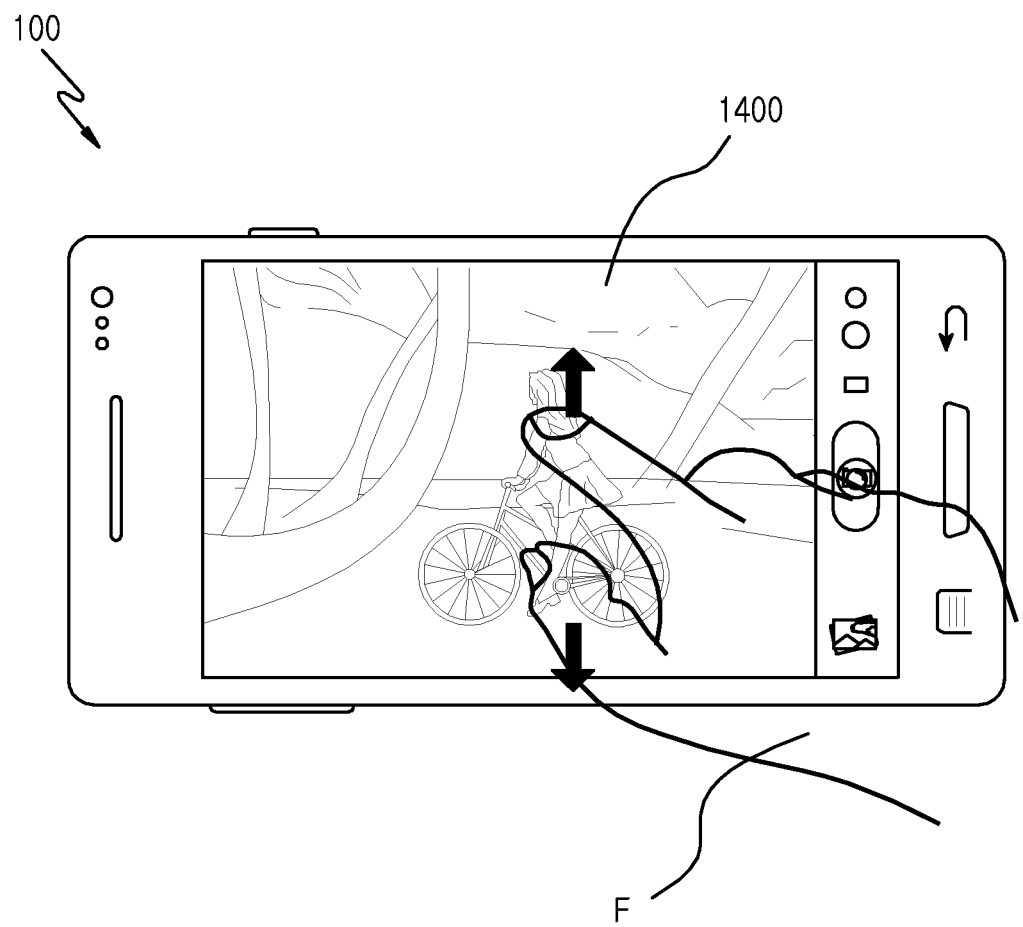
FIG. 14A and FIG. 14B are diagrams illustrating an example of a technique for presenting content based on an optimized file and corresponding original file.
Figure 14B:
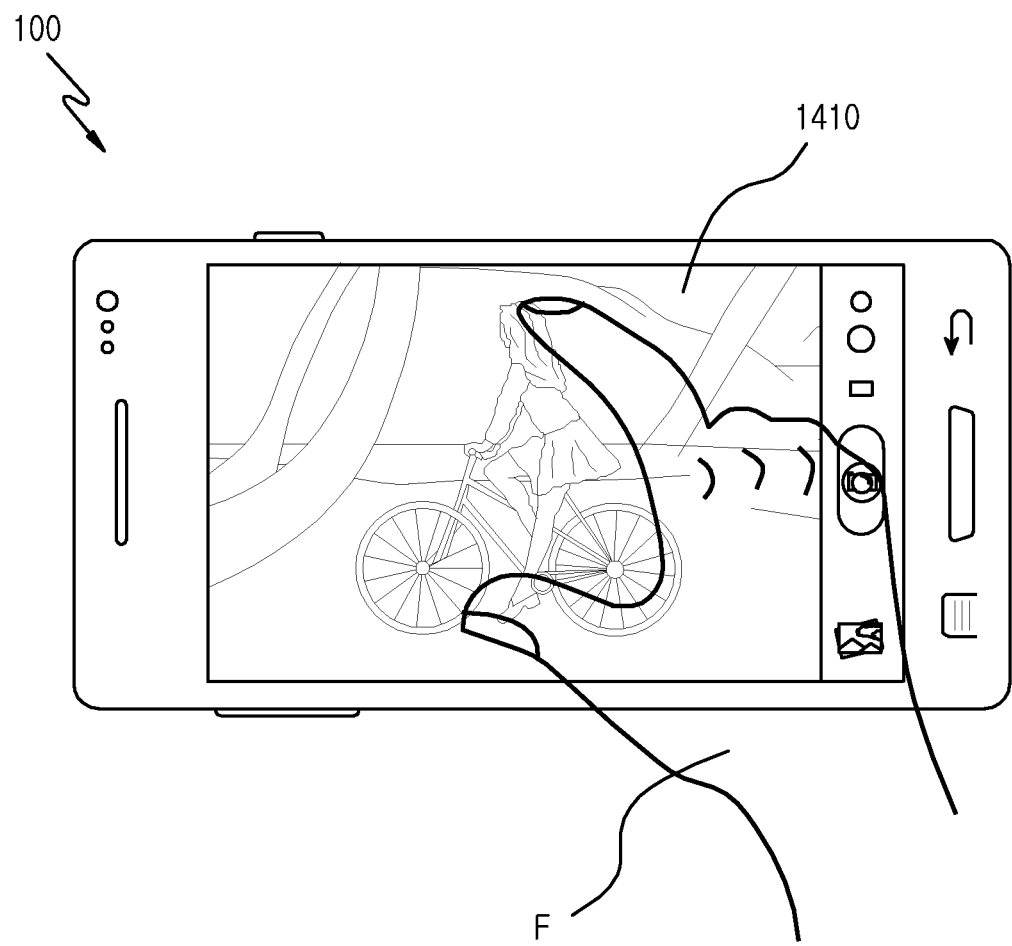

For example, when the optimized file is an image file, the electronic device 100 may display the image on the touch screen 190. After the image is displayed, as shown in FIGS. 14A and 14B, when a user touches a predetermined area of an optimized image file 1400 with two fingers F and drags the two fingers F from an internal direction to an external direction, a pinch in function in which a predetermined area of the optimized image file 1400 is enlarged may be performed. When a predetermined area of the optimized image file 1400 is enlarged to a reference ratio or more, the electronic device 100 may request the original file from the storage device 10. Thus in some implementations, the electronic device 100 may request the original file from the storage device 10 in response to: (i) receiving a given type input, (ii) receiving input having a predetermined characteristic, (iii) receiving input to displayed (or otherwise output) content of the optimized file while the optimized file is displayed or otherwise input, and/or any combination of i, ii, and iii.

In some implementations, the request may be generated based on link information associated with both the optimized file and the original file. As noted above, in some implementations, the link information may be encoded into the optimized image file 1400 and used to retrieve the original image file 1410 from the storage device 10. Thus, in some implementations, transmitting the request for the original image file 1410 may include extracting the link information from the optimized image file 1400 (or otherwise identifying the link information).

Figure 7:
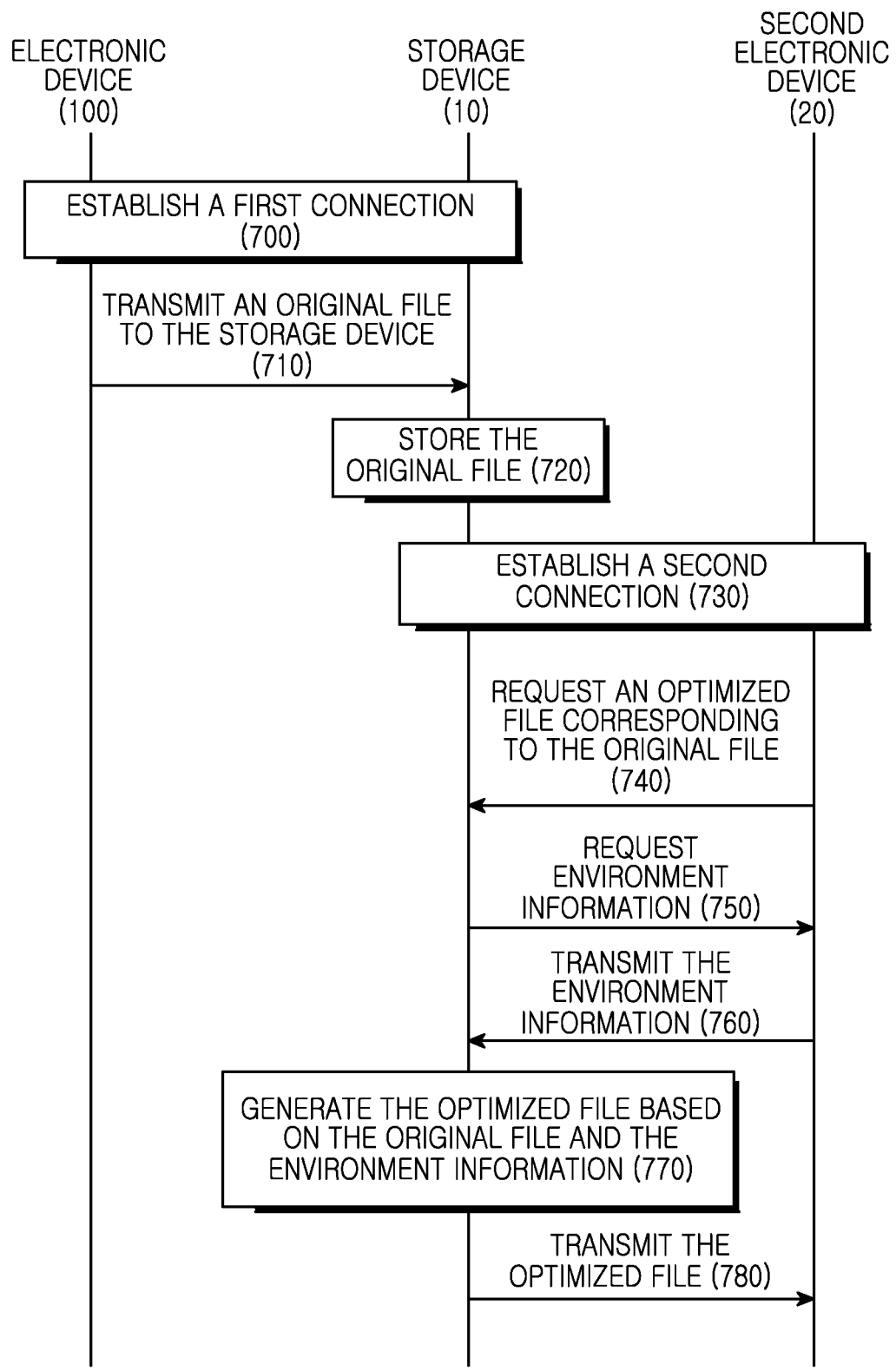
FIG. 7 is a flowchart of an example of a process according to aspects of the disclosure.

FIG. 7 is a flowchart of a process according to aspects of the disclosure. Referring to FIG. 7, at operation 700, the electronic device 100 connects to the storage device 10 over the network 30. At operation 710, the electronic device 100 transmits an original file to the storage device 10. At operation 720, the storage device 10 stores the original file. At operation 730, the second electronic device 20 connects to the storage device 10. At operation 740, the second electronic device 20 requests the original file from the storage device 10. At operation 750, the storage device 10 transmits to the second electronic device 20 a request for environment information of the second electronic device 20. At operation 760, the second electronic device 20 transmits the environment information to the storage device 10. At operation 770, the storage device 10 generates an optimized file corresponding to the original file. In some implementations, the optimized file may be generated based on the environment information of the second electronic device 20. At operation 780, the storage device 10 transmits the optimized file to the second electronic device 20.

Figure 8:
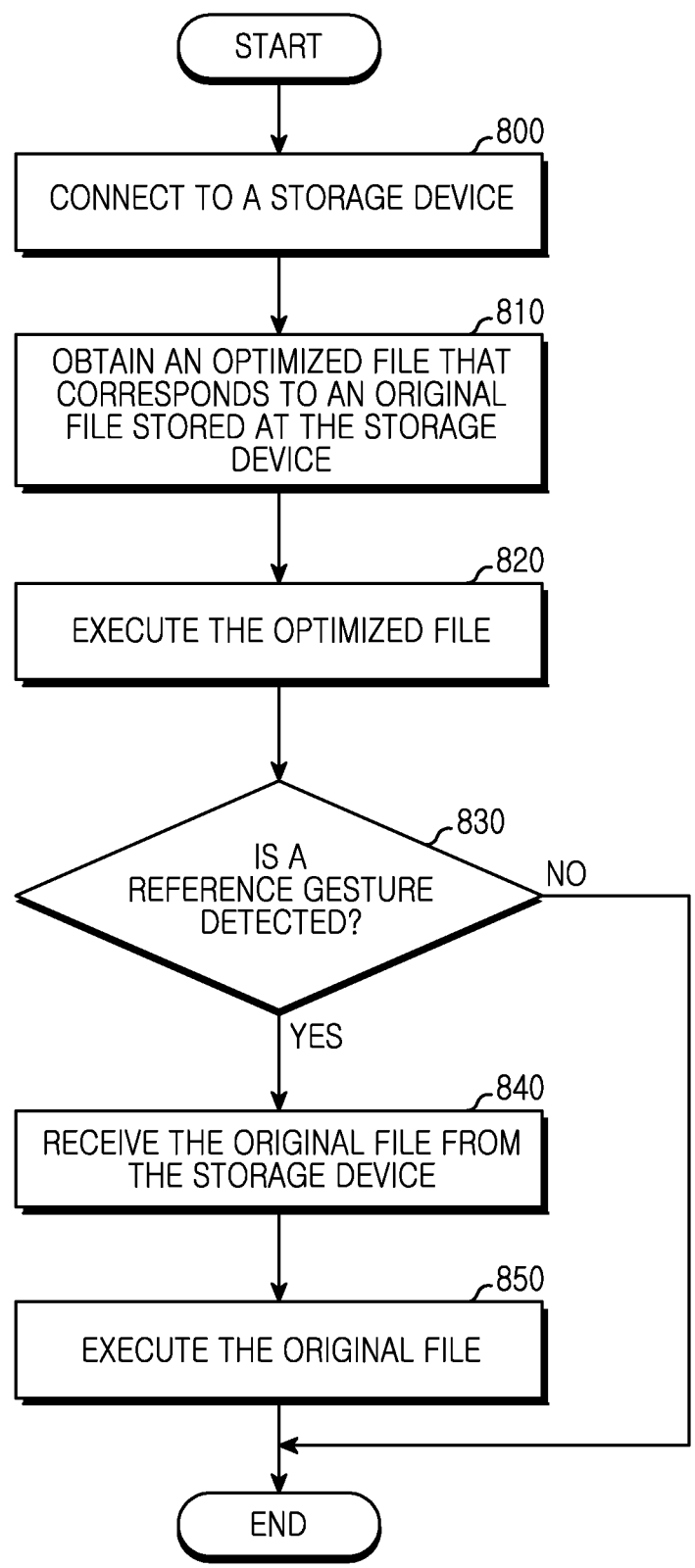
FIG. 8 is a flowchart of an example of a process according to aspects of the disclosure.

FIG. 8 is a flowchart of a process according to aspects of the disclosure. According to the process, at operation 800, the electronic device 100 connects to the storage device 10 over the network 30. At operation 810, the electronic device 100 receives from the storage device 10 an optimized file corresponding to an original file that was previously stored at the storage device 10. At operation 820, the electronic device 100 executes the received optimized file. At operation 830, the electronic device 100 detects input of a reference gesture to the optimized file. The reference gesture may include at least one action of a pinch-in action, a tab action, a flicking action, a touch and drag action, a tab and hold action, and a multi tab action of an optimized file.

According to aspects of the disclosure, when the optimized file is an image file, the electronic device 100 may display the image on the touch screen 190 and perform an editing function of the image. The image file may include thumbnail image. If the input of a reference gesture to the optimized file is detected in operation 830, at operation 840, the electronic device 100 receives an original file corresponding to the optimized file from the storage device 10. At operation 850, the electronic device 100 executes the received original file.

As shown in FIGS. 14A and 14B, an optimized image file 1400 may be displayed on the electronic device 100. When the user performs a pinch gesture on the optimized file, the optimized image file 1400 may be zoomed in. When the user desires the optimized image file to be zoomed in excess of a reference zoom ratio, the electronic device 100 may request the original file corresponding to the optimized file 1400 from the storage device 10. That is, when the electronic device 100 detects a zoom-in gesture, the electronic device 100 may receive from the storage device 10 an original image file 1410 that corresponds to the optimized image file 1400. Afterwards, the electronic device 100 may display the original image file 1410 in place of the optimized image file 1400. However, the reference gesture is not limited thereto and may include various gesture actions in addition to a pinch-in action.

Thus, as illustrated, in some implementations, the same reference gesture may trigger the performance of multiple operations. More precisely, the same reference gesture may cause two or more of (i) the transmittal of a request for an original file corresponding to a rendered optimized file to be transmitted; (ii) the removal of the optimized file from display; and (iii) the display of the original file in place of the optimized file. As noted above, the reference gesture may be an input attempting to enter text or other content into the optimized file.

Figure 15:
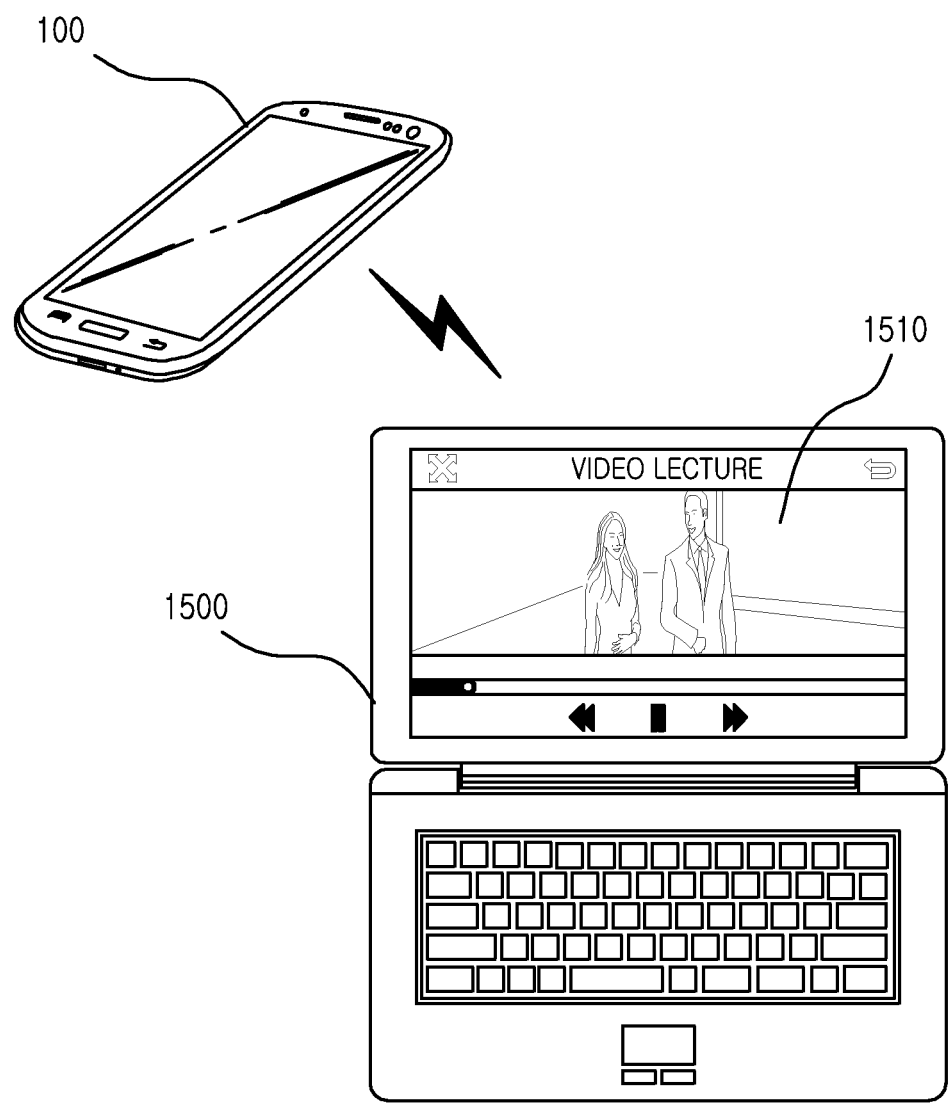
FIG. 15 is a diagram illustrating an example of a technique for remotely storing an original file.

As shown in FIG. 15, when the electronic device 100 streams an original video file to another electronic device 1500 using a wireless connection method, for example, a Digital Living Network Alliance (DLNA) or airplay function and executes the video file in the another electronic device 1500, the electronic device 100 may receive an original video 1510 of the video file from the storage device 10. The electronic device 100 may transmit the received original video 1510 to the another electronic device 1500. That is, when the another electronic device 1500 executes an optimized video received from the electronic device 100, if a quality (e.g. resolution) thereof is reduced and displayed, the electronic device 100 may request the original file from the storage device 10. However, it is not limited thereto and a reference gesture may be set by a user.

According to aspects of the disclosure, when an optimized file is a text file, a reference gesture may include detection of a touch pen.

Figure 16A:
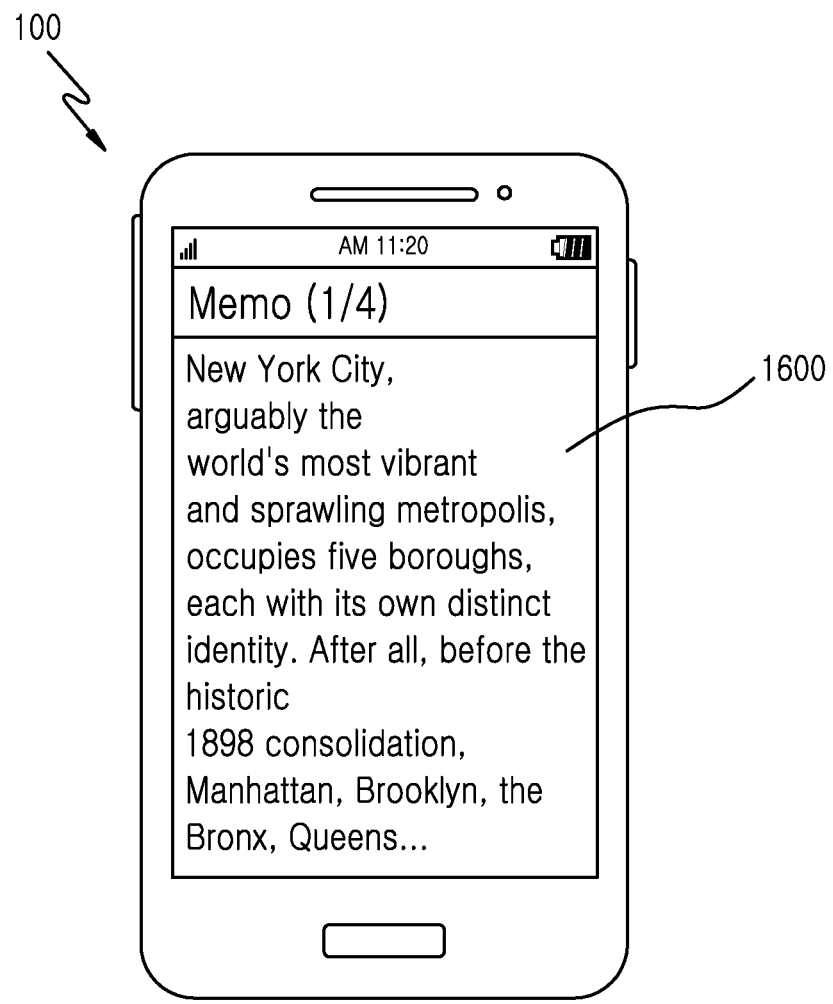
FIG. 16A and FIG. 16B are diagrams illustrating an example of a technique for presenting content based on an optimized file and corresponding original file.
Figure 16B:
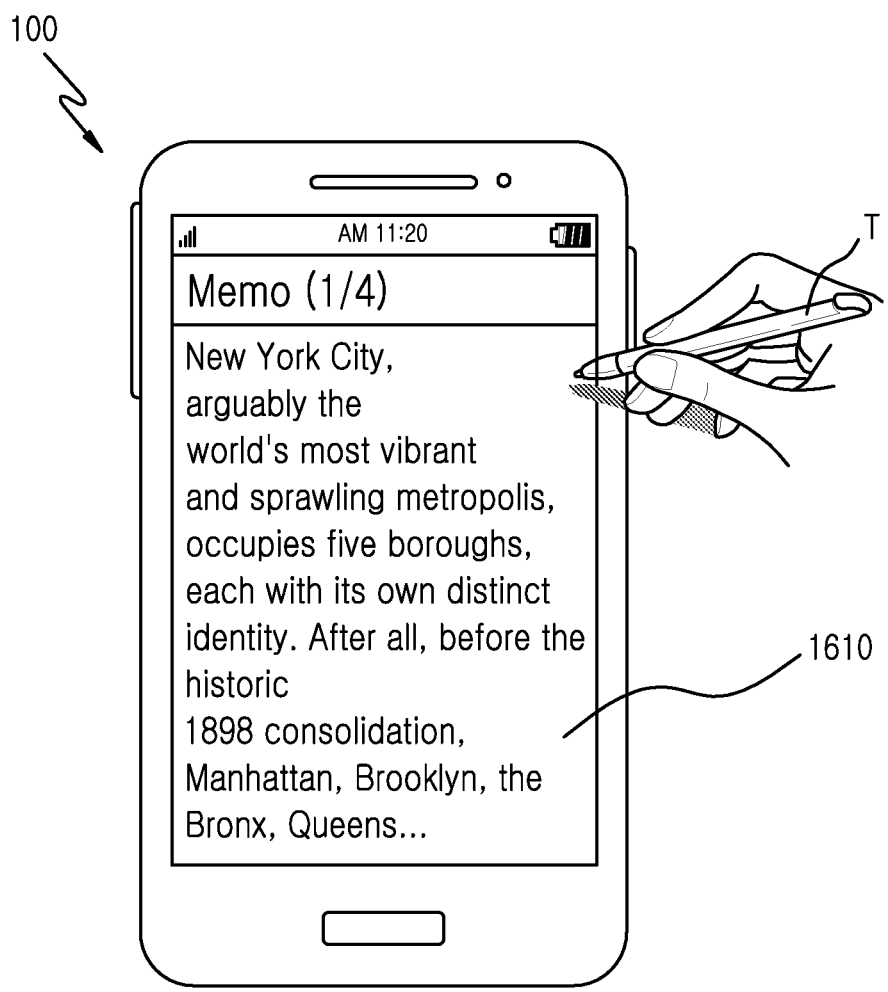

As shown in FIGS. 16A and 16B, in a state in which an optimized read-only text file 1610 is executed (e.g., displayed) when the electronic device 100 detects a touch with a touch pen T (or another input for editing the text file), the electronic device 100 may request an original text file 1610 corresponding to the optimized text file 1600 from the storage device 10. In such a case, the electronic device 100 may replace the optimized text file 1600, which is read-only, with the original text file 1610 that is editable. However, a reference gesture is not limited thereto and a specific key input or predetermined various reference gestures may be used in addition to detection of a touch pen.

It is to be understood that the processes disclosed herein are provided as an example only. At least some of the operations that are part of these processes may be performed in a different order, concurrently, or altogether omitted. Each of the operations discussed with respect to FIGS. 1-16A may be performed by a processor and/or other processing circuitry.

As these and other variations and combinations of the features discussed above can be utilized without departing from the disclosed subject matter as defined by the claims, the foregoing description of exemplary embodiments should be taken by way of illustration rather than by way of limitation of the disclosed subject matter as defined by the claims. It will also be understood that the provision of examples of the disclosed subject matter (as well as clauses phrased as "such as," "e.g.", "including", "in some aspects, "in some implementations", and the like) should not be interpreted as limiting the disclosed subject matter to the specific examples; rather, the examples are intended to illustrate only some of many possible aspects The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

What is claimed is:

1. A method in an electronic device, the method comprising:
   establishing a network connection with a storage device;
   transmitting an image file to the storage device from the electronic device after establishing the network connection with the storage device;
   identifying, in response to the transmitting of the image file, a lower resolution image file corresponding to the image file;
   in response to identifying the lower resolution image file, storing, in a memory of the electronic device, the lower resolution image file as replacement of the image file;
   receiving a user input for receiving the image file from the storage device, wherein the user input is associated with a portion of a display included in the electronic device where the lower resolution image file is displayed;
   displaying, in response to the user input, an enlarged lower resolution image file while receiving the image file from the storage device; and
   displaying, in response to the receiving of the image file, the received image file on the display as a replacement of the enlarged lower resolution image file.

2. The method of claim 1, the method further comprising:
   deleting, in response to the displaying the received image file, the lower resolution image file from the memory of the electronic device.

3. The method of claim 1, wherein the user input corresponds to a pinch-out gesture; and
   wherein the displaying the enlarged lower resolution image file comprises displaying the lower resolution image file with a magnification according to the pinch-out gesture.

4. The method of claim 3, wherein the displaying the received image file comprises displaying the received image file with the magnification where the enlarged lower resolution image file is displayed.

5. The method of claim 4, wherein the storage device comprises at least one of Home sync, a Network Attached Storage (NAS), a cloud server, or a peripheral device for backup; and
   wherein the lower resolution image file is smaller in size than the image file.

6. A method in an electronic device, the method comprising:
   establishing a network connection with a storage device;
   transmitting an image file to the storage device from the electronic device after establishing the network connection with the storage device;
   identifying, in response to the transmitting of the image file, a lower resolution file corresponding to the image file based on memory capacity of a memory included in the electronic device;
   storing, in response to identifying the lower resolution file, the lower resolution file as replacement of the image file;
   displaying the lower resolution file on the display;
   receiving, a user input for receiving the image file from the storage device;
   displaying, in response to the user input, an enlarged lower resolution file on the display while receiving the image file from the storage device; and
   displaying, in response to the receiving of the image file, the received image on the display as a replacement of the enlarged lower resolution file.

7. The method of claim 6, wherein the displaying the received image file comprises:
   displaying, in response to the receiving of the image file, the received image file in at least portion of the display where the enlarged lower resolution file is displayed.

8. The method of claim 6, wherein the storing the lower resolution file comprises deleting the image file from the memory based on the memory capacity.

9. The method of claim 6, wherein the storage device comprises at least one of Home sync, a Network Attached Storage (NAS), a cloud server, or a peripheral device for backup; and
   wherein the lower resolution file is smaller in size than the image file.

10. An electronic device comprising:
    a memory;
    a display;
    a communication unit; and
    a processor configured to:
    transmit an image stored in the memory to a storage device that a network connection is established via the communication unit;
    store a lower resolution image corresponding to the image in the memory as a replacement of the image;
    display the lower resolution image on the display;
    receive a user input for receiving the image from the storage device;
    in response to the user input, display an enlarged lower resolution image on the display while receiving the image from the storage device via the communication unit; and
    display, in response to the receiving of the image, the received image on the display as a replacement of the enlarged lower resolution image.

11. The electronic device of claim 10, wherein the processor is further configured to:
    delete, in response to the displaying the received image, the lower resolution image from the memory.

12. The electronic device of claim 10, wherein the processor is further configured to delete the image based on a hardware resource of the electronic device, and wherein the lower resolution image includes link information.

13. The electronic device of claim 10, wherein the storage device comprises at least one of Home sync, a Network Attached Storage (NAS), a cloud server, or a peripheral device for backup; and
    wherein the lower resolution image is smaller in memory size than the image.

14. The electronic device of claim 10, wherein the processor is configured to stores the lower resolution image in the memory as the replacement of the image by removing the image from the memory.

15. The electronic device of claim 10, wherein the user input comprises a pinch gesture for enlarging the lower resolution image on the display.

16. An electronic device comprising:
a memory;
a display;
a communication unit; and
a processor configured to:
control the communication unit to establish a network connection with a storage device;
control the communication unit to transmit an image file to the storage device from the electronic device after establishing the network connection with the storage device;
identify, in response to the transmitting of the image file, a lower resolution image file corresponding to the image file based on memory capacity of the memory;
store, in response to identifying the lower resolution image file, the lower resolution image file as replacement of the image file;
display the lower resolution image file on the display;
receive, a user input for receiving the image file from the storage device;
display, in response to receiving the user input, an enlarged lower resolution image file on the display while receiving the image file from the storage device; and
display, in response to the receiving of the image file, the received image on the display as a replacement of the enlarged lower resolution image file.

17. The electronic device of claim 16, wherein the processor is, further configured to:
display, in response to the receiving of the image file, the received image file in at least portion of the display where the enlarged lower resolution image file is displayed.

18. The electronic device of claim 16, wherein a hardware resource comprises one of an amount of available memory of the electronic device, processing power of the electronic device, and resolution of the display of the electronic device, and
wherein the processor is further configured to generate the lower resolution image file from the image file based on the hardware resource.

19. The electronic device of claim 16, wherein the storage device comprises at least one of Home sync, a Network Attached Storage (NAS), a cloud server, or a peripheral device for backup; and
wherein the lower resolution is smaller in memory size than the image file.

* * * * *